(12) United States Patent
Hamlin et al.

(10) Patent No.: US 11,513,795 B2
(45) Date of Patent: Nov. 29, 2022

(54) SYSTEMS AND METHODS FOR FIRMWARE-BASED USER AWARENESS ARBITRATION

(71) Applicant: Dell Products L.P., Round Rock, TX (US)

(72) Inventors: Daniel L. Hamlin, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 373 days.

(21) Appl. No.: 16/910,710

(22) Filed: Jun. 24, 2020

(65) Prior Publication Data
US 2021/0406006 A1 Dec. 30, 2021

(51) Int. Cl.
*G06F 9/22* (2006.01)
*G06F 9/455* (2018.01)
*G06F 15/177* (2006.01)

(52) U.S. Cl.
CPC ............... *G06F 9/22* (2013.01); *G06F 9/455* (2013.01); *G06F 15/177* (2013.01)

(58) Field of Classification Search
CPC ........... G06F 9/22; G06F 9/455; G06F 15/177
See application file for complete search history.

(56) References Cited

U.S. PATENT DOCUMENTS

| | | | |
|---|---|---|---|
| 2008/0273088 A1* | 11/2008 | Shu | H04N 7/18 340/541 |
| 2016/0188889 A1* | 6/2016 | Narendra Trivedi | G06F 21/606 713/189 |
| 2018/0191687 A1* | 7/2018 | Munafo | G06F 21/602 |
| 2019/0172427 A1* | 6/2019 | Saini | G09G 5/005 |
| 2022/0009082 A1* | 1/2022 | Monceaux | B25J 9/1602 |
| 2022/0066538 A1* | 3/2022 | Iyer | G06F 21/606 |

\* cited by examiner

*Primary Examiner* — Zahid Choudhury
(74) *Attorney, Agent, or Firm* — Jackson Walker L.L.P.

(57) ABSTRACT

A method may include, in an operating system, implementing a sensor hub in firmware of a platform controller hub of an information handling system, the sensor hub configured to implement a plurality of sensor physical microdrivers, each of the plurality of sensor physical microdrivers corresponding to a respective sensor of a plurality of sensors and configured to communicate a signal representing a physical quantity sensed by the respective sensor; a plurality of algorithm microdrivers implemented as virtual microdrivers, each of the plurality of algorithm microdrivers corresponding to a respective sensor physical microdriver of the plurality of sensor physical microdrivers; and a user-awareness arbitration microdriver implemented as a virtual microdriver and configured to receive an arbitration policy for user awareness detection, receive sensor information from the plurality of algorithm microdrivers, and based on the arbitration policy, apply arbitration logic to the sensor information to determine a user awareness.

15 Claims, 3 Drawing Sheets

SYSTEMS AND METHODS FOR FIRMWARE-BASED USER AWARENESS ARBITRATION

TECHNICAL FIELD

The present disclosure relates in general to information handling systems, and more particularly systems and methods for determining user awareness including user awareness arbitrated by information handling system firmware.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An up and coming feature on information handling systems is that of user awareness detection, sometimes referred to as attention status sensing. In general, user awareness detection may analyze features related to a user (e.g., tracking a user's face position, eye position, and gaze) to determine whether a user proximate to an information handling system is focused and attentive to a task or other information at the information handling system. Awareness detection may be used for securing access to an information handling system, aiding in maintaining a user's productivity, and/or other for other uses.

In some instances, an information handling system may have multiple user awareness detection solutions. However, existing approaches do not provide effective arbitration among such awareness detection solutions, resulting in lack of a seamless user awareness detection experience without user experience disruption.

SUMMARY

In accordance with the teachings of the present disclosure, the disadvantages and problems associated with user awareness may be reduced or eliminated.

In accordance with embodiments of the present disclosure, an information handling system may include a processor, a plurality of sensors, and a platform controller hub interfaced between the processor and the plurality of sensors and configured to implement a sensor hub in firmware of the platform controller hub. The sensor hub may be configured to implement a plurality of sensor physical microdrivers, each of the plurality of sensor physical microdrivers corresponding to a respective sensor of the plurality of sensors and configured to communicate a signal representing a physical quantity sensed by the respective sensor. The sensor hub may also be configured to implement a plurality of algorithm microdrivers implemented as virtual microdrivers, each of the plurality of algorithm microdrivers corresponding to a respective sensor physical microdriver of the plurality of sensor physical microdrivers. The sensor hub may further be configured to implement a user-awareness arbitration microdriver implemented as a virtual microdriver and configured to receive an arbitration policy for user awareness detection, receive sensor information from the plurality of algorithm microdrivers, and based on the arbitration policy, apply arbitration logic to the sensor information to determine a user awareness.

In accordance with these and other embodiments of the present disclosure, a method comprising, in an operating system, implementing a sensor hub in firmware of a platform controller hub of an information handling system, the sensor hub configured to implement a plurality of sensor physical microdrivers, each of the plurality of sensor physical microdrivers corresponding to a respective sensor of a plurality of sensors and configured to communicate a signal representing a physical quantity sensed by the respective sensor; a plurality of algorithm microdrivers implemented as virtual microdrivers, each of the plurality of algorithm microdrivers corresponding to a respective sensor physical microdriver of the plurality of sensor physical microdrivers; and a user-awareness arbitration microdriver implemented as a virtual microdriver and configured to receive an arbitration policy for user awareness detection, receive sensor information from the plurality of algorithm microdrivers, and based on the arbitration policy, apply arbitration logic to the sensor information to determine a user awareness.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to implement a sensor hub in firmware of a platform controller hub of an information handling system, the sensor hub configured to implement a plurality of sensor physical microdrivers, each of the plurality of sensor physical microdrivers corresponding to a respective sensor of a plurality of sensors and configured to communicate a signal representing a physical quantity sensed by the respective sensor; a plurality of algorithm microdrivers implemented as virtual microdrivers, each of the plurality of algorithm microdrivers corresponding to a respective sensor physical microdriver of the plurality of sensor physical microdrivers; and a user-awareness arbitration microdriver implemented as a virtual microdriver and configured to receive an arbitration policy for user awareness detection, receive sensor information from the plurality of algorithm microdrivers, and based on the arbitration policy, apply arbitration logic to the sensor information to determine a user awareness.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
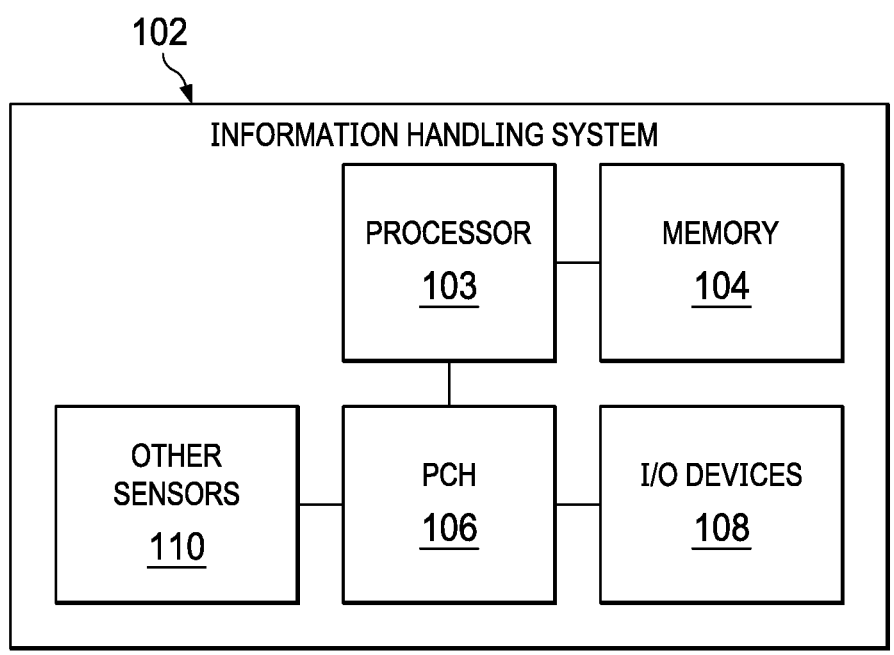
FIG. 1 illustrates a block diagram of an example information handling system, in accordance with certain embodiments of the present disclosure.
Figure 2:
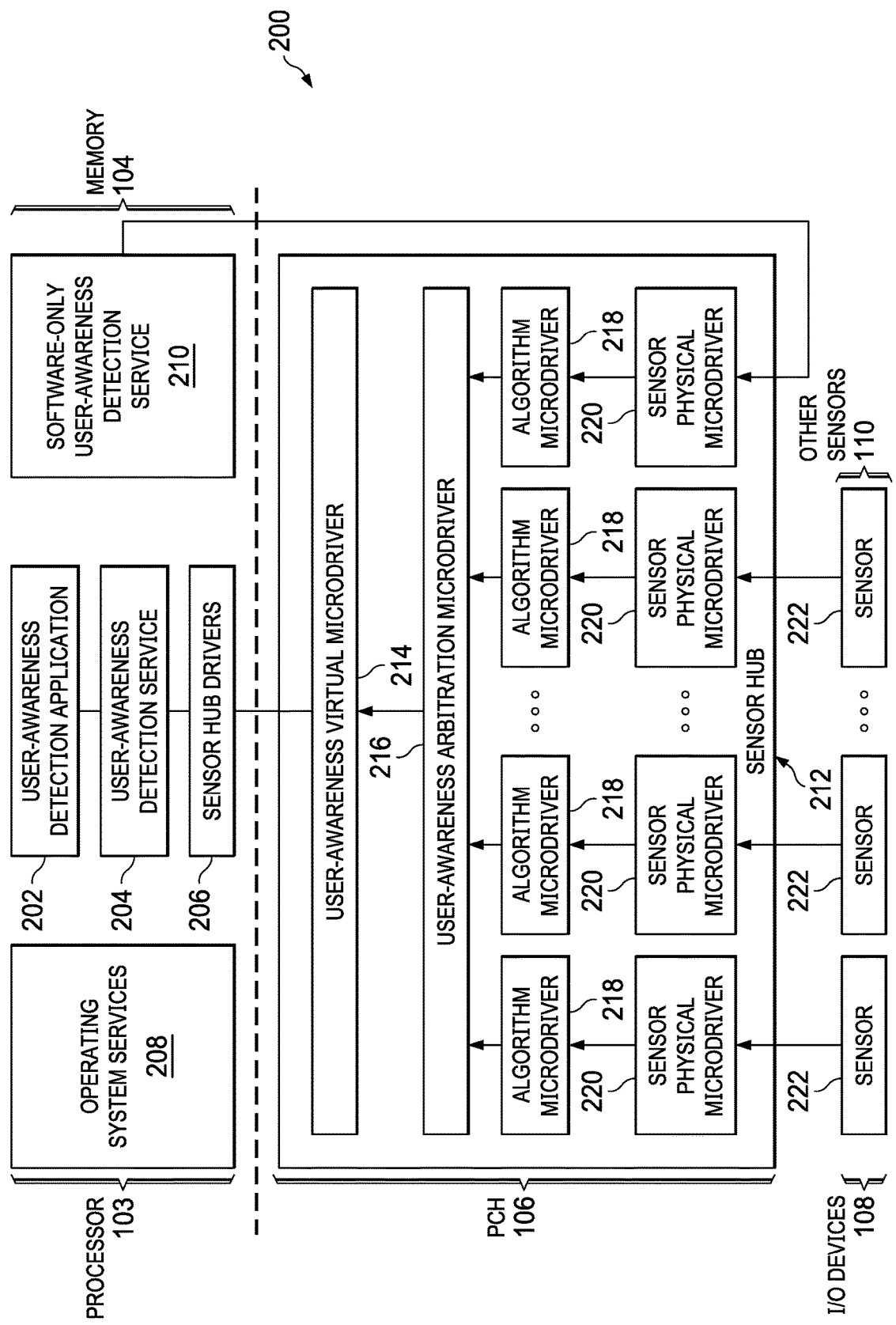
FIG. 2 illustrates an architecture for an example system for firmware-based user arbitration, in accordance with certain embodiments of the present disclosure.
Figure 3:
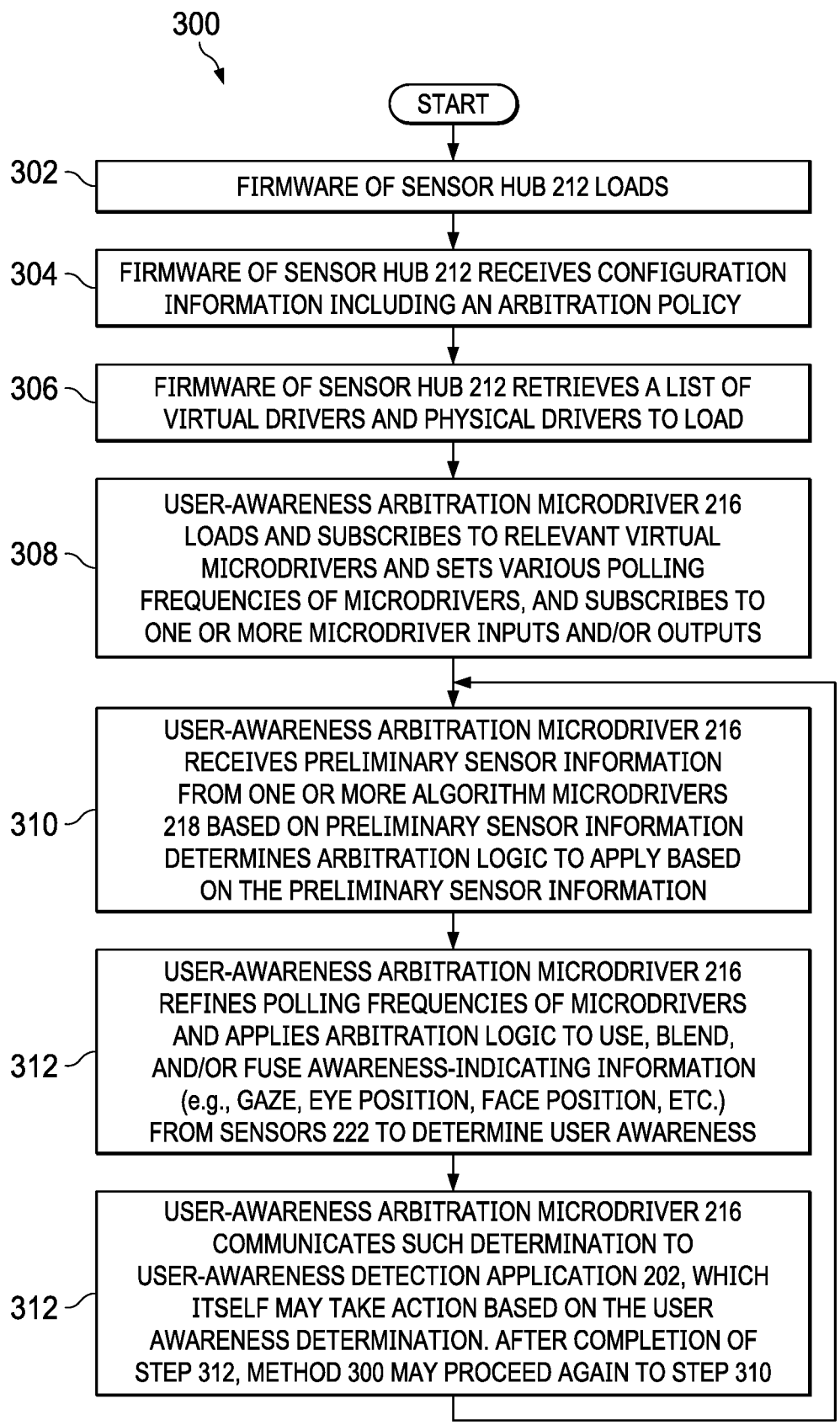
FIG. 3 illustrates a flow chart of an example method for firmware-based user arbitration, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), IEEE 802.11ad (Wireless Gigabit or "WiGig"), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red, and laser.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example information handling system 102, in accordance with certain embodiments of the present disclosure. In some embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a platform controller hub (PCH) 106 communicatively coupled to processor 103, input/output devices 108 communicatively coupled to processor 103 via PCH 106, and one or more other sensors 110 communicatively coupled to processor 103 via PCH 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. For example, one such function may include implementing a management engine. A management engine may comprise hardware and/or firmware that enables remote out-of-band management for information handling system 102 in order to monitor, maintain, update, upgrade, and/or repair information handling system 102.

Each of one or more input/output (I/O) devices 108 may comprise any system, device, or apparatus configured to generate output to a user or another component and/or configured to receive input from a user or another component. Examples of I/O devices 108 may include a display, a keyboard, a mouse, an interactive touch screen, a camera, and/or associated controllers.

Each of one or more other sensors 110 may include any system, device, or apparatus configured to sense one or more physical quantities, and generate one or more signals indicative of such one or more physical quantities. An example of a sensor 110 may include a temperature sensor, an ambient light sensor, a proximity sensor, a motion sensor, a camera, and any other suitable sensor.

In addition to processor 103, memory 104, PCH 106, I/O devices 108, and other sensors 110, information handling system 102 may include one or more other information handling resources.

FIG. 2 illustrates an architecture for an example system 200 for firmware-based user arbitration, in accordance with certain embodiments of the present disclosure.

As shown in FIG. 2, processor 103 and memory 104 may implement a user-awareness detection application 202 that executes on top of an operating system, a user-awareness detection service 204 running under user-awareness detection application 202, and sensor hub drivers 206 that may serve as a driver interface between user-awareness detection service 204 and a sensor hub 212. Processor 103 and memory 104 may also implement operating system services 208 and software-only user-awareness detection service 210. Software-only user-awareness detection service 210 may comprise a management service that manages an arbitration policy for user awareness detection, either via an operating system executing on processor 103 or a management sideband interface.

As also shown in FIG. 2, PCH 106 may include or may otherwise implement a sensor hub 212. In some embodiments, sensor hub 212 may be an integral part of an Intel Integrated Sensor Hub. As described in greater detail below, sensor hub 212 may include a plurality of sensor physical microdrivers 220, each configured to interface with a sensor 222, with the exception of at least one sensor physical microdriver 220, which may be configured to interface with software-only user-awareness detection service 210. Accordingly, software-only user-awareness detection service 210 may emulate a physical sensor akin to one of sensors 222. Sensor physical microdrivers 220 may be configured to receive measurements of their respective sensors 222, or in the case of software-only user-awareness detection service 210, configuration data.

Further, sensor hub 212 may implement a plurality of virtual microdrivers as algorithm microdrivers 218, wherein each algorithm microdriver 218 may receive from its corresponding sensor physical microdriver 220 one or more signals indicative of physical quantities or parameters sensed by sensors 222 associated with each sensor physical microdriver 220, or in the case of software-only user-awareness detection service 210, signals indicative of an arbitration policy. Each algorithm microdriver 218 may perform logic on the signals it receives from sensor physical microdriver 220 to condition such signals for consumption by user awareness arbitration microdriver 216.

Sensor hub 212 may also implement a virtual microdriver as a user-awareness arbitration microdriver 216. User-awareness arbitration microdriver 216 may be configured to receive the various conditioned sensor data from algorithm microdrivers 218 and based thereon, including the policy information communicated from software-only user-awareness detection service 210, and identify which conditioned sensor information to use from algorithm microdrivers 218 to make a determination of user awareness. In essence, user-awareness arbitration microdriver 216 may select data from a sensor 222 or fuse data from multiple sensors 222 to make a determination of user awareness. For example, a policy may provide that particular sensor data is more reliable based on a particular state of ambient lighting proximate to information handling system 102.

Upon making such determination of user awareness, user-awareness arbitration microdriver 216 may communicate such determination to user-awareness detection application 202 via the "stack" of user-awareness virtual microdriver 214, sensor hub drivers 206, and user-awareness detection service 204, whereupon user-awareness detection application 202 may take an action based on the detected user awareness.

FIG. 3 illustrates a flow chart of an example method 300 for firmware-based user arbitration, in accordance with certain embodiments of the present disclosure. According to one embodiment, method 300 may begin at step 302. As noted above, teachings of the present disclosure may be implemented in a variety of configurations of information system 102. As such, the preferred initialization point for method 300 and the order of the steps comprising method 300 may depend on the implementation chosen.

At step 302, firmware of sensor hub 212 may load. Upon loading, at step 304 firmware of sensor hub 212 may receive, for example from software-only user-awareness detection service 210 via sensor physical microdriver 220 and algorithm microdriver 218, configuration information including an arbitration policy.

At step 306, based on the arbitration policy, firmware of sensor hub 212 may retrieve a list of virtual drivers (e.g., algorithm microdrivers 218, user-awareness arbitration microdrivers 216, user-awareness virtual microdriver 214) and physical drivers (e.g., sensor physical microdrivers 220) to load.

At step 308, user-awareness arbitration microdriver 216, executing within firmware of sensor hub 212, may load and subscribe to relevant virtual microdrivers and set various polling frequencies of microdrivers, and subscribe to one or more microdriver inputs and/or outputs.

At step 310, user-awareness arbitration microdriver 216 may receive preliminary sensor information from one or more algorithm microdrivers 218 and based thereon, determine arbitration logic to apply based on the preliminary sensor information. For example, at step 310, such preliminary sensor information may include information regarding ambient light proximate to information handling system 102, and based thereon, user-awareness arbitration microdriver 216 may determine which arbitration logic to apply to other sensor information.

At step 312, user-awareness arbitration microdriver 216 may further refine various polling frequencies of microdrivers and apply arbitration logic to use, blend, and/or fuse awareness-indicating information (e.g., gaze, eye position, face position, etc.) from sensors 222 to determine a user awareness.

To clarify, "preliminary sensor information" may be information used by user-awareness arbitration microdriver 216 to determine arbitration logic that defines how to use awareness-indicating information. On the other hand, "awareness-indicating information" is information that may be indicative of user awareness. Thus, preliminary sensor information may be used to determine how to make a user awareness determination from awareness-indicating information. To further illustrate, preliminary sensor information may include information regarding ambient light. Based on a level of ambient light, some user awareness detection approaches may work better than others. Accordingly, based on such level of ambient light and/or other preliminary sensor information, user-awareness arbitration microdriver 216 may determine, from a plurality of possible approaches, a "preferred" approach for user-awareness determination and thus apply arbitration logic for undertaking such approach. Based on such arbitration logic, user-awareness arbitration microdriver 216 may appropriate weight, blend, and/or fuse awareness-indicating information (e.g., user gaze, eye position, face position, etc.) to make a determination of user awareness.

At step 314, user-awareness arbitration microdriver 216 may communicate such determination to user-awareness detection application 202, which itself may take action based on the user awareness determination. After completion of step 312, method 300 may proceed again to step 310.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a plurality of sensors; and
   a platform controller hub interfaced between the processor and the plurality of sensors and configured to implement a sensor hub in firmware of the platform controller hub, the sensor hub configured to implement:
   a plurality of sensor physical microdrivers, each of the plurality of sensor physical microdrivers corresponding to a respective sensor of the plurality of sensors and configured to communicate a signal representing a physical quantity sensed by the respective sensor;
   a plurality of algorithm microdrivers implemented as virtual microdrivers, each of the plurality of algorithm microdrivers corresponding to a respective sensor physical microdriver of the plurality of sensor physical microdrivers; and
   a user-awareness arbitration microdriver implemented as a virtual microdriver and configured to:
     receive an arbitration policy for user awareness detection;
     receive sensor information from the plurality of algorithm microdrivers; and
     based on the arbitration policy, apply arbitration logic to the sensor information to determine a user awareness.

2. The information handling system of claim 1, wherein the user-awareness arbitration microdriver is further configured to:
   receive preliminary sensor information;
   based on the preliminary sensor information and the arbitration policy, determine the arbitration logic to be applied; and
   apply the arbitration logic to awareness-indicating sensor information to determine the user awareness.

3. The information handling system of claim 2, wherein the arbitration logic to be applied defines at least one of a weighting, blending, and fusion of the awareness-indicating sensor information used to determine the user awareness.

4. The information handling system of claim 1, wherein the sensor hub is further configured to implement:
   a separate sensor physical microdriver in communication with a software-only user-awareness detection service that defines the arbitration policy; and
   a separate algorithm microdriver implemented as a virtual microdriver corresponding to the separate sensor physical microdriver;
   wherein the user-awareness arbitration microdriver is further configured to receive the arbitration policy from the software-only user-awareness detection service via the separate sensor physical microdriver and the separate algorithm microdriver.

5. The information handling system of claim 1, wherein the user-awareness arbitration microdriver is further configured to communicate the user awareness to one of an operating system of the information handling system and an application executing on the operating system.

6. A method comprising, in an operating system, implementing a sensor hub in firmware of a platform controller hub of an information handling system, the sensor hub configured to implement:
   a plurality of sensor physical microdrivers, each of the plurality of sensor physical microdrivers corresponding to a respective sensor of a plurality of sensors and configured to communicate a signal representing a physical quantity sensed by the respective sensor;
   a plurality of algorithm microdrivers implemented as virtual microdrivers, each of the plurality of algorithm microdrivers corresponding to a respective sensor physical microdriver of the plurality of sensor physical microdrivers; and
   a user-awareness arbitration microdriver implemented as a virtual microdriver and configured to:
      receive an arbitration policy for user awareness detection;
      receive sensor information from the plurality of algorithm microdrivers; and
      based on the arbitration policy, apply arbitration logic to the sensor information to determine a user awareness.

7. The method of claim 6, wherein the user-awareness arbitration microdriver is further configured to:
   receive preliminary sensor information;
   based on the preliminary sensor information and the arbitration policy, determine the arbitration logic to be applied; and
   apply the arbitration logic to awareness-indicating sensor information to determine the user awareness.

8. The method of claim 7, wherein the arbitration logic to be applied defines at least one of a weighting, blending, and fusion of the awareness-indicating sensor information used to determine the user awareness.

9. The method of claim 6, wherein the sensor hub is further configured to implement:
   a separate sensor physical microdriver in communication with a software-only user-awareness detection service that defines the arbitration policy; and
   a separate algorithm microdriver implemented as a virtual microdriver corresponding to the separate sensor physical microdriver;
   wherein the user-awareness arbitration microdriver is further configured to receive the arbitration policy from the software-only user-awareness detection service via the separate sensor physical microdriver and the separate algorithm microdriver.

10. The method of claim 6, wherein the user-awareness arbitration microdriver is further configured to communicate the user awareness to one of an operating system of the information handling system and an application executing on the operating system.

11. An article of manufacture comprising:
    a non-transitory computer-readable medium; and
    computer-executable instructions carried on the computer-readable medium, the instructions readable by a processing device, the instructions, when read and executed, for causing the processing device to implement a sensor hub in firmware of a platform controller hub of an information handling system, the sensor hub configured to implement:
       a plurality of sensor physical microdrivers, each of the plurality of sensor physical microdrivers corresponding to a respective sensor of a plurality of sensors and configured to communicate a signal representing a physical quantity sensed by the respective sensor;
       a plurality of algorithm microdrivers implemented as virtual microdrivers, each of the plurality of algorithm microdrivers corresponding to a respective sensor physical microdriver of the plurality of sensor physical microdrivers; and
       a user-awareness arbitration microdriver implemented as a virtual microdriver and configured to:
          receive an arbitration policy for user awareness detection;
          receive sensor information from the plurality of algorithm microdrivers; and
          based on the arbitration policy, apply arbitration logic to the sensor information to determine a user awareness.

12. The article of claim 11, wherein the user-awareness arbitration microdriver is further configured to:
    receive preliminary sensor information;
    based on the preliminary sensor information and the arbitration policy, determine the arbitration logic to be applied; and
    apply the arbitration logic to awareness-indicating sensor information to determine the user awareness.

13. The article of claim 12, wherein the arbitration logic to be applied defines at least one of a weighting, blending, and fusion of the awareness-indicating sensor information used to determine the user awareness.

14. The article of claim 11, wherein the sensor hub is further configured to implement:
    a separate sensor physical microdriver in communication with a software-only user-awareness detection service that defines the arbitration policy; and
    a separate algorithm microdriver implemented as a virtual microdriver corresponding to the separate sensor physical microdriver;

wherein the user-awareness arbitration microdriver is further configured to receive the arbitration policy from the software-only user-awareness detection service via the separate sensor physical microdriver and the separate algorithm microdriver.

15. The article of claim 11, wherein the user-awareness arbitration microdriver is further configured to communicate the user awareness to one of an operating system of the information handling system and an application executing on the operating system.

* * * * *